(12) United States Patent
Jonsson

(10) Patent No.: US 7,385,302 B2
(45) Date of Patent: Jun. 10, 2008

(54) WIND TURBINE HAVING VARIABLE PITCH AIRFOILS

(76) Inventor: Stanley C. Jonsson, 442 Hillcrest Rd., San Mateo, CA (US) 94402

( * ) Notice: Subject to any disclaimer, the term of this patent is extended or adjusted under 35 U.S.C. 154(b) by 0 days.

(21) Appl. No.: 11/475,459

(22) Filed: Jun. 27, 2006

(65) Prior Publication Data
US 2007/0296218 A1    Dec. 27, 2007

(51) Int. Cl.
*H02J 1/12* (2006.01)
(52) U.S. Cl. .............. 290/54; 290/42; 290/55; 290/53; 290/44
(58) Field of Classification Search .............. 290/54, 290/42, 44, 55, 53; 415/4.4, 907
See application file for complete search history.

(56) References Cited

U.S. PATENT DOCUMENTS

| | | | |
|---|---|---|---|
| 543,462 A | 7/1895 | Bramwell | |
| 2,038,467 A * | 4/1936 | Zanoski | 416/119 |
| 4,659,940 A | 4/1987 | Shepard | |
| 4,818,888 A | 4/1989 | Lenoir, III | |
| 4,832,569 A | 5/1989 | Samuelsen et al. | |
| 5,083,899 A | 1/1992 | Koch | |
| 5,591,004 A | 1/1997 | Aylor | |
| 5,765,990 A | 6/1998 | Jones | |
| 6,015,258 A | 1/2000 | Taylor | |
| 6,064,123 A | 5/2000 | Gislason | |
| 6,116,178 A * | 9/2000 | McCabe | 114/102.13 |
| 6,629,815 B2 | 10/2003 | Lusk | |
| 6,688,842 B2 * | 2/2004 | Boatner | 415/4.2 |
| 6,921,986 B2 * | 7/2005 | Bayer | 290/55 |
| 6,926,491 B2 * | 8/2005 | Migler | 415/4.4 |
| 6,929,450 B2 * | 8/2005 | Noble | 416/1 |
| 7,218,013 B2 * | 5/2007 | Platt | 290/55 |
| 2002/0015639 A1 | 2/2002 | Roberts | |
| 2002/0079705 A1 | 6/2002 | Fowler | |
| 2002/0187038 A1 | 12/2002 | Streetman | |
| 2003/0025335 A1 | 2/2003 | Elder | |
| 2003/0035725 A1 | 2/2003 | Sosonkina | |
| 2003/0042743 A1 | 3/2003 | Gingras et al. | |
| 2003/0049128 A1 | 3/2003 | Rogan | |
| 2003/0056506 A1 | 3/2003 | Cutcher | |
| 2003/0223858 A1 | 12/2003 | O'Connor et al. | |
| 2003/0235498 A1 | 12/2003 | Boatner | |
| 2004/0001752 A1 | 1/2004 | Noble | |
| 2004/0036297 A1 | 2/2004 | John | |
| 2004/0041407 A1 | 3/2004 | Petterson et al. | |
| 2004/0042894 A1 | 3/2004 | Smith | |
| 2004/0071541 A1 | 4/2004 | Rainbow | |
| 2004/0141843 A1 | 7/2004 | Blank et al. | |
| 2004/0141845 A1 | 7/2004 | Ohlmann | |

\* cited by examiner

*Primary Examiner*—Darren Schuberg
*Assistant Examiner*—Iraj A Mohandesi
(74) *Attorney, Agent, or Firm*—Gordon & Rees, LLP

(57) ABSTRACT

A wind turbine, having: a rotatable frame; a plurality of airfoils mounted to the rotatable frame, the wherein the airfoils extend parallel to an axis of rotation of the rotatable frame, and wherein the airfoils are individually pivotable with respect to the rotatable frame; and a mechanism that holds each of the airfoils in a high lift/high drag position when the airfoil moves in a direction of air flow. The wind turbine may optionally include a rotational stop to prevent rotation of the air foil from a high drag position to a low drag position when the airfoil is moving in the direction of the wind flow.

12 Claims, 3 Drawing Sheets

WIND TURBINE HAVING VARIABLE PITCH AIRFOILS

TECHNICAL FIELD

The present invention relates generally to electricity producing wind turbines, and in particular to wind turbines having airfoils.

BACKGROUND OF THE INVENTION

Many conventional wind turbine designs already exist for producing electricity. Most commonly, such designs involve a single large propeller mounted at the top end of a vertical mast. Air flow across the propeller causes the propeller to turn, which in turn rotates a generator to produce electricity.

Such conventional wind turbines suffer numerous disadvantages. First, they involve large propellers that must be mounted a considerable distance above the ground. Thus, they require a tall and sturdy mast to which the propeller is mounted. A second disadvantage of large rotating propeller blade systems is that they tend to kill a large number of birds. A third disadvantage of such designs is that the generator is typically positioned at the center of the rotating blades. Thus, the generator is mounted at the top of the mast along with the propeller. This requires the mast to be sufficiently strong to support both the propeller and the generator. As a result, it is difficult to access the turbine for repairs and servicing. A fourth disadvantage of conventional propellers is that the blades rotate in a direction perpendicular to the wind direction. As a result, propeller blade velocity through the air increases with the distance from the center of rotation of the propeller. This unfortunately requires a variable and complex blade section geometry.

SUMMARY OF THE INVENTION

The present invention provides a wind turbine, with: a rotatable frame; a plurality of airfoils mounted to the rotatable frame, the wherein the airfoils extend parallel to an axis of rotation of the rotatable frame, and wherein the airfoils are individually pivotable with respect to the rotatable frame; and a mechanism that holds each of the airfoils in a high lift/high drag position when the airfoil moves in the direction of air flow.

Optionally, the wind turbine may also comprise a rotational stop connected to each of the airfoils to limit pivoting of the airfoils with respect to the rotatable frame to prevent rotation of the air foil from a high drag position to a low drag position when the airfoil is moving in the direction of the air flow. Specifically, the rotational stop limits pivoting of the airfoils with respect to the rotatable frame to prevent rotation of the air foil from a high lift/high drag position to a low drag position when the airfoil is moving in the direction of the air flow.

Optionally as well, the wind turbine may also comprise a channel extending around a portion of the rotatable frame; and a guide on each of the plurality of airfoils, the guide being dimensioned to pass through the channel, wherein the guide prevents rotation of the airfoil with respect to the rotatable frame as the airfoil moves in a direction opposite to the direction of air flow. Specifically, the guide moving in the channel positions the airfoil at the low drag position as the airfoil moves in a direction opposite to the direction of air flow.

Airflow perpendicular to the axis of rotation of the rotatable frame causes the rotatable frame to rotate. The wind turbine is preferably positioned horizontally such that it rotates about a vertical axis. Alternatively, however, the wind turbine may be positioned vertically such that it rotates about a horizontal axis.

A first advantage of the present invention is that, by using airfoils, both "lift" and "drag" may be used to turn the rotatable frame. Specifically, lift caused by air flow over the airfoil causes the rotatable frame to rotate when the airfoils are oriented such that their leading and trailing edges are aligned with the direction of the wind when the airfoil is positioned furthest into the direction of the wind. In addition, drag caused by air flow over the airfoil causes the rotatable frame to rotate when the leading and trailing edges of the airfoil are perpendicular to the direction of the wind when the airfoil is moving in the direction of the wind.

A second advantage of using airfoils is that the same airfoil cross section can be used across the entire width of the airfoil. Therefore, power output of the wind turbine can be increased simply by increasing the width of the airfoils. In contrast, with conventional propeller systems, it is necessary to increase the diameter of the propellers to increase system power output.

A third advantage of the present invention is that a generator drive wheel may be positioned to contact the outer perimeter of the rotatable frame of the device. In contrast, existing wind turbines operate with their generator drive in contact with a rotating mechanism that is disposed at the center of a rotating propeller. As a result, the present system offers gearing advantages due to the comparatively large sized circular frame in contact with the comparatively small sized drive wheel. As a result, power is efficiently generated by the wind turbine due to minimal friction losses translating power into generator rotation.

A fourth advantage is that the present invention has a low center of gravity. Therefore, the present wind turbine is very stable. Moreover, the present system does not require a strong, heavy mast to support a propeller and turbine some distance above the ground. This considerably reduces the weight and size limitations of the present system, resulting in cost savings as compared to traditional designs. Furthermore, having the generator drive wheel (and the turbine itself) positioned close to the ground permits easy access for turbine/drive system repairs and servicing.

A fifth advantage of the present airfoil design is that each of the airfoils experience the same wind velocity along the entire length of their leading edge. Equal wind velocity at all points along the leading edge of the airfoil allows a single simplified airfoil cross section along the entire airfoil length. Thus, the wind turbine horizontal width and not its vertical diameter determines power generation. Moreover, having the airfoils disposed at the perimeter of the device results in the longest possible torque lever arm. This results in the most torque per unit of airfoil force generation.

DETAILED DESCRIPTION OF THE FIGURES

Figure 1:
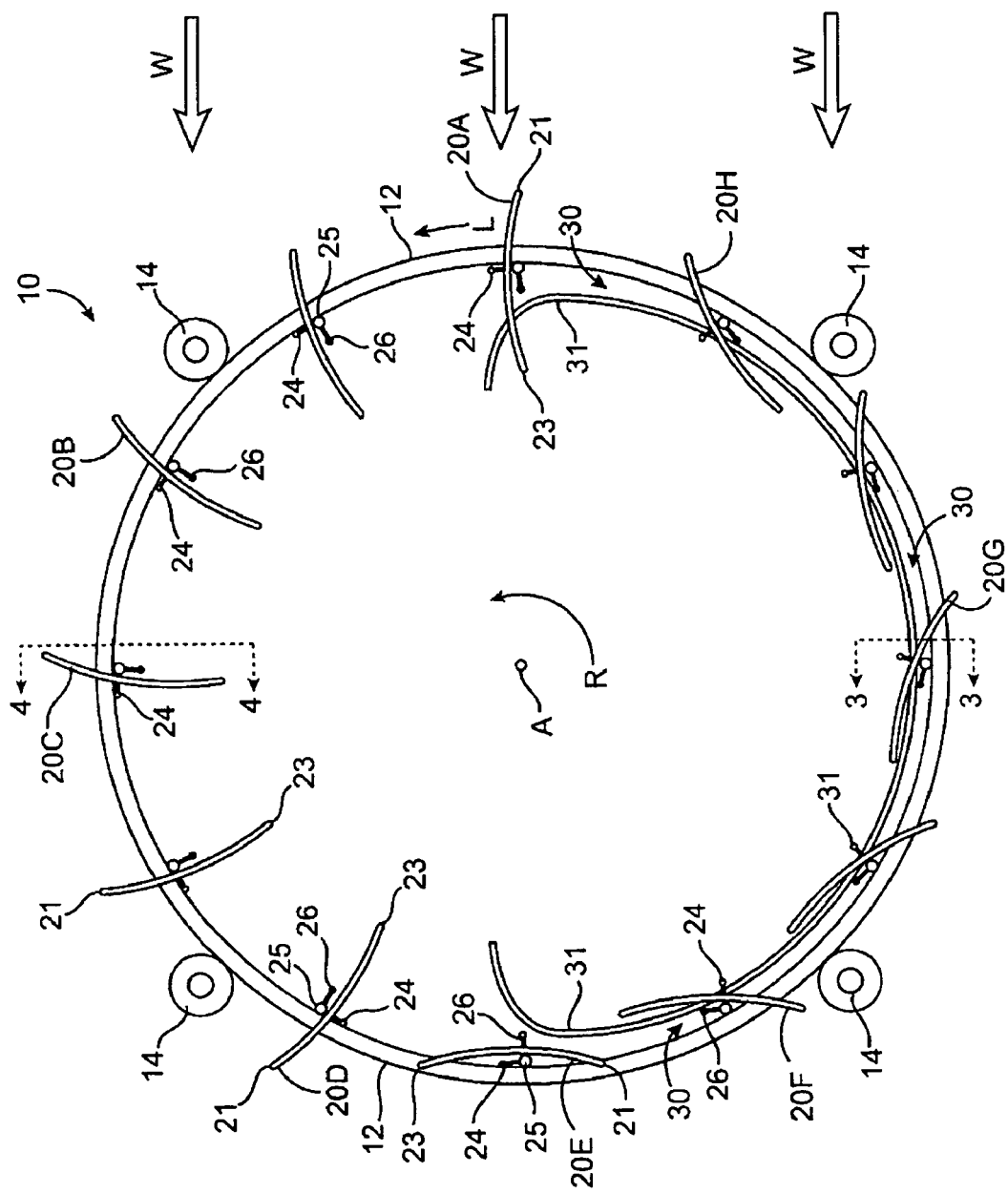
FIG. 1 is a top plan view of the wind turbine.
Figure 2:
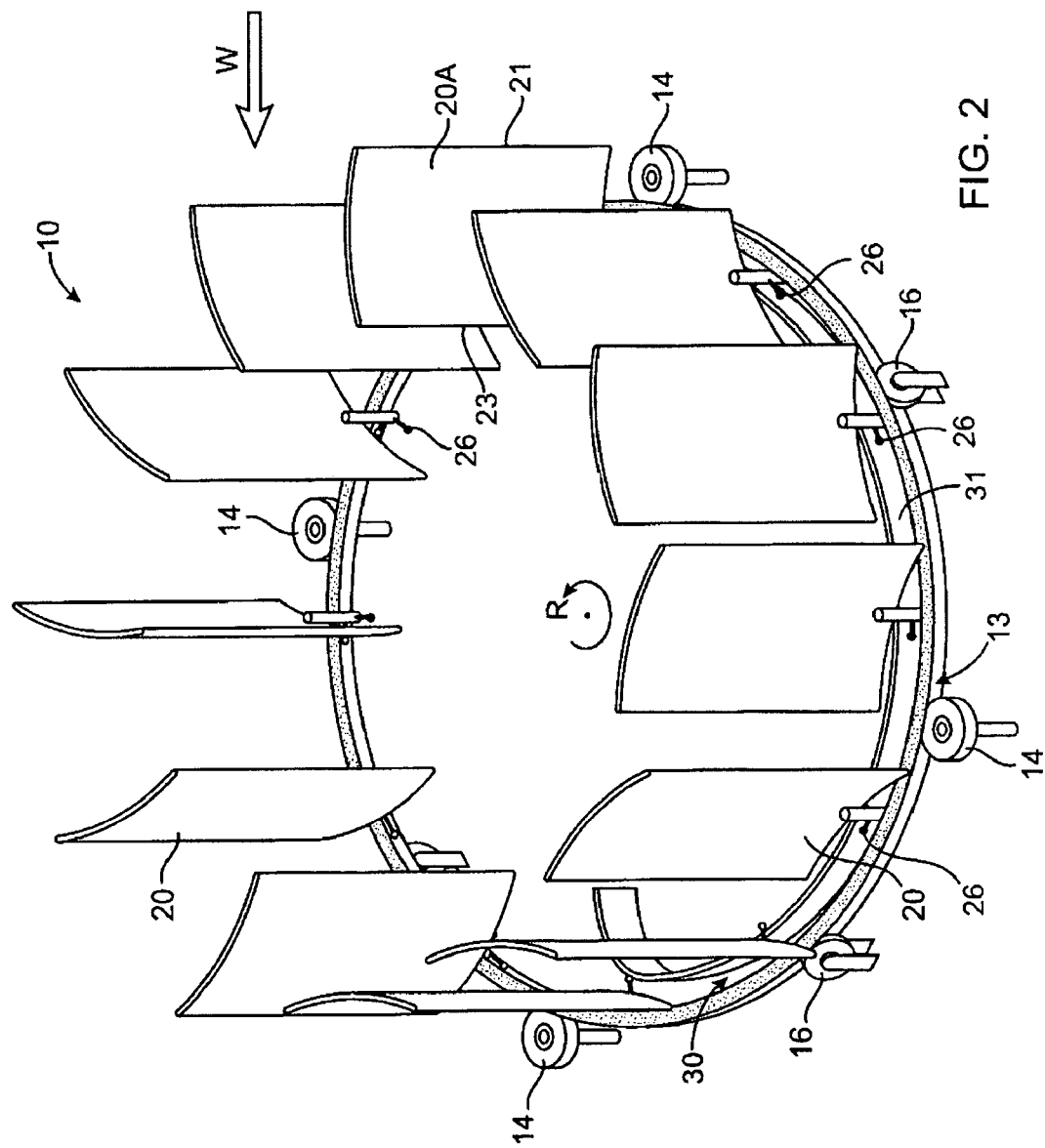
FIG. 2 is a top perspective view of the wind turbine.

FIGS. 1 and 2 are top plan and perspective views of the present invention, the operation of which can be understood, as follows.

Wind turbine 10 includes a rotatable frame 12 having a plurality of airfoils 20 attached thereto. Airfoils 20 are mounted to pivot with respect to rotatable frame 12, as will be fully explained. Rotatable frame 12 may be a circular ring as shown. Rotatable frame 12 may be supported by a plurality of wheels 14 and 16, as shown. In one embodiment shown in FIG. 2, rotatable frame 12 may have a recessed groove 13 in which wheels 14 are received. Wheels 16 support underneath rotatable frame 12, as also shown.

As will be explained, wind moving in direction W acts upon the various pivotable airfoils 20 to cause rotatable frame 12 to move in a counterclockwise direction, thus rotating in direction R around vertical axis of rotation A. As such, rotatable frame 12 circles around axis A while the individual airfoils 20 pivot to point in different directions with respect to rotatable frame 12, as will be fully explained. An optional generator drive wheel 15 (or wheel 14 or 16) in contact with moving rotatable frame 12 may be used for power generation. Alternatively, rotatable frame 12 may itself comprise a rotor of an electric generator.

As can be seen, airfoils 20 are mounted to rotatable frame 12 such that they extend parallel to the axis of rotation A of rotatable frame. An optional rotational stop 24 is provided that holds each of airfoils 20 in a high drag position when the airfoil 20 moves in the direction of air flow (i.e.: in direction W). As will be shown, rotational stop 24 selectively prevents rotation of airfoil 20 with respect to rotatable frame 12 at various locations when airfoil 20 rotates around axis A. At some locations, rotational stop 24 orients airfoil 20 at a position such that lift caused by air flow over airfoil 20 causes rotatable frame 12 to rotate. At other locations, rotational stop 24 orients airfoils 20 at a position such that drag caused by air flow over airfoil 20 causes rotatable frame 12 to rotate. As will be explained, rotational stops 24 limits pivoting of airfoils 20 with respect to rotatable frame 12 to prevent rotation of the individual airfoils 20 from a high drag position to a low drag position when the airfoil is moving in the direction of the air flow W.

Wind turbine 10 also optionally comprises a channel 30 extending around a portion of the rotatable frame 12. Channel 30 is seen as a gap between rotatable frame 12 and member 31. A guide 26 may also be provided on each of individual airfoils 20. As seen in FIG. 1, guides 26 are dimensioned to pass along through channel 30 when rotatable frame 12 rotates in direction R. Guides 26 prevent rotation of airfoils 20 with respect to rotatable frame 12 as airfoils 20 move along through channel 30 (i.e. in a direction opposite to the direction of air flow W). Thus, guides 26 position airfoils 20 at low drag positions as the airfoils 20 move in a direction opposite to the direction of air flow W.

The operation of wind turbine 10 is best understood by viewing the orientation of the various airfoils 20 at locations around rotatable frame 12, as follows.

Airfoil 20A is positioned furthest into the direction of the wind. Airfoil 20A is free to rotate about its pivot. When wind W passes over airfoil 20A, airfoil 20A will rotate such that its leading edge 21 and its trailing edge 22 are aligned with the direction of the wind W. As a result of wind W passing over airfoil 20A, lift is produced as shown by arrow L. As such, lift L urges rotatable frame 12 to rotate in direction R.

Individual airfoils 20 are preferably set to rotate about an axis 25 that is positioned closer to their leading edge 21 than to their trailing edge 23. Accordingly, when the airfoil reaches position illustrated as 20B, wind W will tend to cause airfoil 20B to rotate about its own axis of rotation 25 in a counterclockwise direction. However, rotational stop 24 will prevent such rotation, causing airfoil 20B to increase its angle of attack against the wind.

By the time airfoil 20 reaches the position illustrated by airfoil 20C, the airfoil is positioned perpendicular to wind flow W. Thus, airfoil 20C provides considerable drag, further urging rotatable frame 12 to rotate in direction R.

As frame 12 rotates, the airfoil will eventually reach the position illustrated by airfoil 20D. At such time, wind W pushing on the trailing edge 22 of the airfoil will cause the airfoil to "flip over" to the position shown by airfoil 20E.

Next, when the airfoil reaches the position shown by airfoil 20F, member 31 will contact the end of guide 26, as shown. Member 31 defines a channel 30 next to a portion of rotatable frame 12, as shown. Member 31 holds guide 26 such that airfoil 20 is not able to rotate with respect to rotatable frame 12 as the airfoil moves from the position shown by airfoil 20F to 20G to 20H. Thus, member 31 and guide 26 operate together to hold airfoil 20 is a "low drag" position as it moves opposite to the direction of wind W.

Finally, immediately after the airfoil leaves the position shown by airfoil 20H, guide 26 will no longer contact member 31, and the airfoil will be free once again to pivot with respect to rotatable frame 12. Therefore, as airfoil 20 leaves position 20H, the wind W will act to push the trailing edge 23 of the airfoil to the position shown by airfoil 20A (i.e.: with the leading end 21 and the trailing edge 23 aligned in the direction of wind W).

Although the present wind turbine is shown in a horizontal orientation (i.e.: rotating about a vertical axis of rotation A), the present invention can also be constructed in a vertical orientation (i.e.: rotating about a horizontal axis of rotation).

Figure 4:
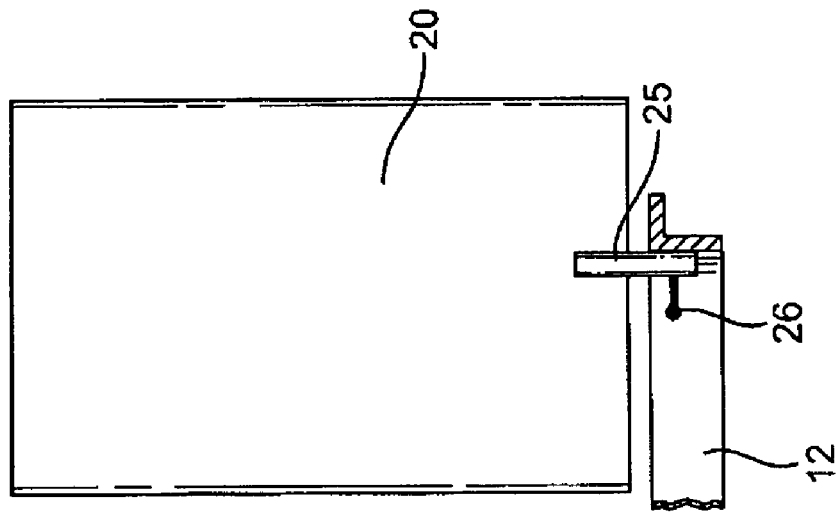
FIG. 4 is a sectional side elevation view of another of the airfoils 20 mounted onto rotatable frame 12 taken along line 4-4 in FIG. 1.
Figure 3:
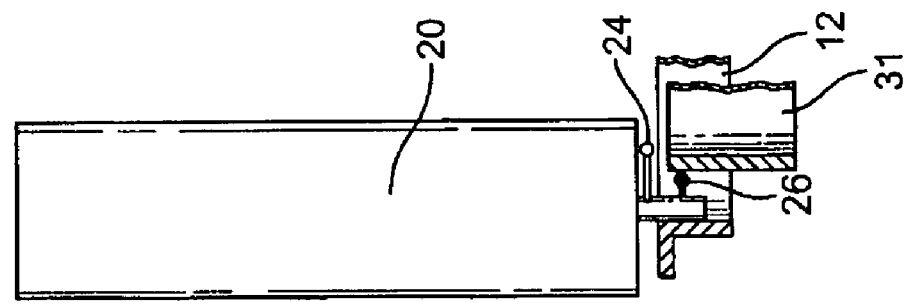
FIG. 3 is a sectional side elevation view of one of the airfoils 20 mounted onto rotatable frame 12 taken along line 3-3 in FIG. 1.

FIGS. 3 and 4 show sectional views through the present invention. FIG. 3 illustrates airfoil 20C, and FIG. 4 illustrates airfoil 20G. Like numerals represent like elements in all Figs.

What is claimed is:

1. A wind turbine, comprising:
   a rotatable frame;
   a plurality of airfoils mounted to the rotatable frame, wherein the airfoils extend parallel to an axis of rotation of the rotatable frame, and wherein the airfoils are individually pivotable with respect to the rotatable frame;
   a mechanism that holds each of the airfoils in a high lift/high drag position when the airfoil moves in a direction of air flow;
   a channel extending around a portion of the rotatable frame; and
   a guide on each of the plurality of airfoils, the guide being dimensioned to pass through the channel, wherein the guide prevents rotation of the airfoil with respect to the rotatable frame as the airfoil moves in a direction opposite to the direction of flow.

2. The wind turbine of claim 1, wherein the guide positions the airfoil at the low drag position as the airfoil moves in a direction opposite to the direction of air flow.

3. A wind turbine, comprising:
   a rotatable frame;
   a plurality of airfoils mounted to the rotatable frame, wherein the airfoils extend parallel to an axis of rotation of the rotatable frame, wherein the airfoils are individually pivotable with respect to the rotatable frame, and wherein the airfoils are permitted to rotate with respect to the rotatable frame when moving in the direction of the air flow; and a mechanism that holds each of the airfoils in a high lift/high drag position when the airfoil moves in a direction of air flow.

4. A wind turbine, comprising:

a rotatable frame;

a plurality of airfoils mounted to the rotatable frame, wherein the airfoils extend parallel to an axis of rotation of the rotatable frame, wherein the airfoils are individually pivotable with respect to the rotatable frame, and wherein the airfoils are not permitted to rotate with respect to the rotatable frame when moving against the direction of the air flow; and a mechanism that holds each of the airfoils in a high lift/high drag position when the airfoil moves in a direction of air flow.

5. The wind turbine of claim 3 or 4, wherein the mechanism comprises:

a rotational stop connected to each of the airfoils to limit pivoting of the airfoils with respect to the rotatable frame to prevent rotation of the airfoil from a high drag position to a low drag position when the airfoil is moving in the direction of the air flow.

6. The wind turbine of claim 5, wherein the rotational stop orients the airfoils at a position such that lift caused by air flow over the airfoil causes the rotatable frame to rotate.

7. The wind turbine of claim 5, wherein the rotational stop orients the airfoils at a position such that drag caused by air flow over the airfoil causes the rotatable frame to rotate.

8. The wind turbine of claim 3 or 4, wherein air flow perpendicular to the axis of rotation of the rotatable frame causes the rotatable frame to rotate.

9. The wind turbine of claim 3 or 4, wherein the rotatable frame rotates about a vertical axis.

10. The wind turbine of claim 3 or 4, wherein each airfoil pivots about an axis positioned closer to the leading edge of the airfoil than to the trailing edge of the airfoil.

11. The wind turbine of claim 3 or 4, further comprising:

a generator drive wheel in contact with the rotatable frame.

12. The wind turbine of claim 3 or 4, wherein the rotatable frame is a rotor of an electric generator.

* * * * *